United States Patent
Lukich et al.

(10) Patent No.: US 7,740,034 B2
(45) Date of Patent: *Jun. 22, 2010

(54) LIGHT DUTY TIRE WITH SILICA-RICH POLYISOPRENE RUBBER BASED INTERMEDIATE TRANSITION LAYER

(75) Inventors: Lewis Timothy Lukich, Akron, OH (US); Erik Paul Sandstrom, Akron, OH (US); Roberto Cerrato Meza, North Canton, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 916 days.

This patent is subject to a terminal disclaimer.

(21) Appl. No.: 11/312,620

(22) Filed: Dec. 20, 2005

(65) Prior Publication Data

US 2007/0137745 A1    Jun. 21, 2007

(51) Int. Cl.
*B60C 1/00* (2006.01)
*B60C 11/00* (2006.01)

(52) U.S. Cl. .................. 152/209.5; 152/532; 152/537

(58) Field of Classification Search .............. 152/209.5, 152/532, 537
See application file for complete search history.

(56) References Cited

U.S. PATENT DOCUMENTS

| | | | |
|---|---|---|---|
| 3,814,160 A * | 6/1974 | Creasey | 152/209.5 |
| 5,503,940 A * | 4/1996 | Majumdar et al. | 152/565 |
| 5,871,597 A * | 2/1999 | Vasseur | 152/209.5 |
| 6,561,244 B2 | 5/2003 | Zanzig et al. | 152/209.5 |
| 6,581,660 B2 | 6/2003 | Meza et al. | 152/209.5 |
| 2004/0261926 A1 * | 12/2004 | Ozel et al. | 152/209.5 |
| 2007/0144642 A1 * | 6/2007 | Lukich et al. | 152/209.5 |

FOREIGN PATENT DOCUMENTS

| | | | |
|---|---|---|---|
| DE | 19949396 | * | 11/2000 |
| EP | 341187 | * | 11/1989 |
| EP | 708136 | * | 4/1996 |
| EP | 738614 | * | 10/1996 |
| JP | 03-007602 | * | 1/1991 |
| JP | 11-060810 | * | 3/1999 |
| JP | 2004-284453 | * | 10/2004 |

OTHER PUBLICATIONS

Machine translation for Europe 708136 (no date).*
Machine translation for Japan 2004-284453 (no date).*
Machine translation for German 19949396 (no date).*
Machine translation for Japan 11-060810 (no date).*

* cited by examiner

*Primary Examiner*—Steven D Maki
(74) *Attorney, Agent, or Firm*—Henry C. Young, Jr.

(57) ABSTRACT

This invention relates to a light duty tire (e.g. passenger tire or light duty truck tire) designed for a load bearing capacity of a maximum of 3,500 pounds (1587 kg) with a tread of a cap/base construction with at least one underlying silica-rich, cis 1,4-polyisoprene rubber based intermediate transition rubber layer to promote a reduced internal heat generation for the light duty tire and to therefore promote a light load carrying light duty tire which is more durable for the long haul. Such light duty tire tread is intended for use with light loads in which internal heat may be generated within the tire, including the tire tread, during use.

7 Claims, 1 Drawing Sheet

# LIGHT DUTY TIRE WITH SILICA-RICH POLYISOPRENE RUBBER BASED INTERMEDIATE TRANSITION LAYER

FIELD OF THE INVENTION

This invention relates to a light duty tire (e.g. passenger tire or light duty truck tire) designed for a load bearing capacity of a maximum of 3,500 pounds (1587 kg) with a tread of a cap/base construction with at least one underlying silica-rich, cis 1,4-polyisoprene rubber based intermediate transition rubber layer to promote a reduced internal heat generation for the light duty tire and to therefore promote a light load carrying light duty tire which is more durable for the long haul. Such light duty tire tread is intended for use with light loads in which internal heat may be generated within the tire, including the tire tread, during use.

By the term "cis 1,4-polyisoprene rubber rich" it is meant that the rubber composition is composed of greater than 50 phr of cis 1,4-polyisoprene rubber which may be natural and/or synthetic cis 1,4-polyisoprene rubber, preferably natural rubber, or primarily natural rubber. By the term "transition layer" is meant that the rubber layer is considered herein to provide a physical transition between the tread cap of a tread of a cap/base construction and the underlying circumferential belt plies.

BACKGROUND OF THE INVENTION

Light duty tires (e.g. passenger vehicle tires and light duty truck tires, preferably passenger vehicle tires) may experience internal heat build up and a corresponding increase in operating temperature as the light duty tire is being used on an associated vehicle.

Such light duty tire internal heat buildup is considered herein to be significantly different from internal heat buildup generated under a relatively heavy load in heavy duty tires (e.g. heavy duty trucks and large off-the-road material hauling vehicles carrying heavy loads). Heat build up in a light duty tire tread during the working of such light duty tires can be of sufficient magnitude to cause such light duty tires to operate at significantly high temperatures, particularly at high speeds, and thereby have an impact upon their long term heat durability.

For this invention, it is proposed to provide at least one transition rubber layer of at least one silica-rich, cis 1,4-polyisoprene rubber based composition positioned between the light duty tire tread cap layer and underlying circumferential belt plies to promote low hysteresis to reduce heat generation and thereby promote an associated long term durability, to promote adhesion of the transition rubber layer and adjoining rubber layers and also to promote tear resistance of the transition rubber layer.

Further, by way of providing such transition rubber in a form of a silica-rich rubber composition, the transition rubber layer in the light duty tire may be of a color which contrasts with the black color of adjoining carbon black reinforced, diene-based elastomer based tire components when said transition layer contains only a minimal amount of carbon black reinforcement, if any, and contains a colorant.

In one aspect, the light duty tire of this invention is a tire having a maximum load bearing capacity of 3,500 pounds (1587 kg), preferably a maximum load bearing capacity of 3,000 pounds (1361 kg), and therefore is considered herein to be significantly different from a heavy duty tire having a minimum load bearing capacity of 4,000 pounds (1814 kg). Reference: *The Tire And Rim Association Hand Book.*

The term "phr" where used herein means "parts per weight of a specified material per 100 parts by weight rubber, or elastomer, in a rubber composition".

SUMMARY AND PRACTICE OF THE INVENTION

In accordance with this invention, a light duty tire is provided with a circumferential tread of a cap/base construction and a circumferential belt layer;

wherein said light duty tire (e.g. a passenger vehicle tire or a light truck tire and preferably a passenger tire) has a maximum load bearing capacity of 3,500 pounds (1587 kg) and preferably a maximum load bearing capacity of 3,000 pounds (1361 kg);

wherein said tread cap/base construction is comprised of a circumferential outer tread cap rubber layer which contains a running surface for the tire and a tread base rubber layer (said tread base rubber layer underlying said tread cap rubber layer);

wherein said circumferential belt layer is comprised of a rubber composition which contains cord reinforcement comprised of a plurality of cords and underlies said circumferential tread;

characterized in that said light duty tire contains at least one internal (therefore not visibly observable on an outer surface of said heavy duty tire) silica-rich, cis 1,4-polyisoprene rubber based transition rubber layer, wherein:

(A) said transition rubber layer is said tread base layer;

(B) said transition rubber layer is an intermediate rubber layer positioned between said tread base rubber layer and said circumferential belt layer;

(C) said transition rubber layer is said belt layer, or (D) said transition rubber layer is a combination of at least two of said transition tread base layer, said intermediate transition rubber layer and said belt transition layer;

wherein said silica-rich transition rubber layer is of a rubber composition comprised of, based upon 100 parts by weight per 100 parts by weight rubber (phr);

(1) rubber comprised of:
 (a) natural cis 1,4-polyisoprene rubber, or
 (b) a combination of natural cis 1,4-polyisoprene rubber and synthetic cis 1,4-polyisoprene rubber, or
 (c) natural cis 1,4-polyisoprene rubber and up to 25 phr of at least one additional diene-based rubber, or
 (d) a combination of natural cis 1,4-polyisoprene rubber and synthetic cis 1,4-polyisoprene rubber and up to 25 phr of at least one additional diene-based rubber (2) about 30 to about 55 phr of reinforcing filler comprised of:
 (a) precipitated silica, or
 (b) precipitated silica and rubber reinforcing carbon black wherein the weight ratio of said precipitated silica and said rubber reinforcing carbon black is at least 1/1 (e.g. 1/1 or a higher ratio), and (3) coupling agent for said precipitated silica having a moiety reactive with hydroxyl groups (e.g. silanol groups) contained on said precipitated silica and another different moiety interactive with said cis 1,4-polyisoprene rubber and said additional diene-based elastomer.

In further practice of the invention, said rubber composition for said transition rubber layer may contain at least one anti-reversion agent to further promote its long term durability. Representative of such anti-reversion agents are, for example, N,N'metaphenylenebismaleimide, hexamethylene bis-thiosulfate salt dihydrate and 1,3-bis(citraconimidamethyl benzene).

In practice, rubber composition of said transition rubber layer may contain a colorant to color said transition rubber layer a color other than a black color and which preferably contrasts with black.

In practice, the colorant may be comprised of titanium dioxide (white colored pigment). For example, the colorant of such transition rubber layer composition may preferably be composed of titanium dioxide where a white colored transition rubber layer is desired. Also, such colorant may contain, or be comprised, of at least one non-black organic pigment and/or non-black inorganic pigment or dye, wherein said colorant is alternately used in combination with titanium dioxide as a color brightener.

Various colorants other than or in combination with said titanium dioxide may be used to provide a non-black color to the transition rubber layer. Representative of such colorants are, for example, yellow colored colorants as Diarylide Yellow™ pigment from PolyOne Corporation and Akrosperse E-6837™ yellow EPMB pigment masterbatch with an EPR (ethylene/propylene rubber) from the Akrochem Company. As discussed above, such yellow colored pigment may be used in combination and therefore together with titanium dioxide.

Properties considered herein as being significant for the rubber composition of said transition layer are reported in the following Table A in terms of Target Property Values.

TABLE A

| Target Properties | Target Property Values |
| --- | --- |
| Tan delta, 100° C., 10% strain, 1 Hz | 0.1 or less |
| Tear resistance | greater than 100 Newtons |
| Storage modulus (G'), 100° C., 10% strain, 1 Hz | range of from 500 to 1500 kPa |

In practice, it is desired that the tan delta value be 0.1 or less in order to promote low hysteresis for the rubber composition which in turn promotes lower heat build up for the transition rubber layer and a cooler running tire.

In practice, it is desired that the Tear resistance value be greater than 100 Newtons in order to promote good rubber component-to-component adhesion and tear strength within the silica rich polyisoprene rubber based transition rubber layer.

In practice, it is desired that the Storage modulus (G') value be in a range of from 500 to 1500 kPa in order to promote adequate stiffness to prevent, or suitably resist, movement of the silica rich polyisoprene rubber transition layer during compression or shear caused by heavy loads on the tire.

A significant aspect of the invention is having a rubber component in a form of a transition rubber layer in a critical tire area which has a suitable (e.g. optimum) balance of stiffness, hysteresis, tear strength and adhesion to adjacent components which, in turn promotes a more durable, lasting tire.

In practice, representative of said additional conjugated diene-based elastomers for use in the rubber composition of said transition zone layer, for example, polymers and copolymers of dienes of at least one of isoprene and 1,3-butadiene and copolymers of styrene and at least one of isoprene and 1,3-butadiene (other than said natural cis 1,4-polysioprene rubber). Representative of such elastomers are, for example, synthetic cis-1,4-polyisoprene, cis-1,4-polybutadiene and styrene-butadiene rubbers and blends thereof.

Such elastomers are generally blended with various compounding ingredients such as, for example, reinforcing fillers as hereinbefore discussed, zinc oxide, stearic acid, sulfur, accelerators, antioxidants, antiozonants and the like in conventional amounts.

Various coupling agents may be used for the precipitated silica of the silica-rich transition rubber layer. If desired, such coupling agent may be free of, and therefore exclusive of, carbon black.

For example, a suitable coupling agent may be a bis(3-trialkoxysilylalkyl) polysulfide having from 2 to 8 sulfur atoms, with an average of from 2 to 4 sulfur atoms in its polysulfidic bridge, exemplary is a bis(3-triethoxysilylpropyl) polysulfide. Other coupling agents may be, for example, organoalkoxymertaptosilanes such as for example, mercaptopropyltrimethoxysilane, and mercaptopropyltriethoxysilane. The amount of the sulfur-containing alkylene alkoxy silane compounds of the present invention may vary, for example, from about 0.01 to about 0.2 weight percent of the silica. The coupling agent may be used with or without (exclusive of) a carbon black carrier so that the transition rubber layer may be on a non-black color.

An example of a coupling agent is, for example, a liquid, carbon black-free, Si266™ from Degussa as bis-(3-triethoxysilylpropyl) polysulfide having an average of about 2.2 connecting sulfur atoms in its polysulfidic bridge.

BRIEF DESCRIPTION OF THE DRAWINGS

For a further understanding of the invention, drawings are provided. In particular, FIG. 1 (FIG. 1), as well as FIG. 2, FIG. 3 and FIG. 4, are provided as depicting a partial cross-sectional view of a pneumatic tire having a cap/base configured tread in which at last one silica-rich, natural rubber based transition rubber layer is provided.

THE DRAWINGS (A) Transition Layer as a Tread Base Layer

(B) Transition Layer as an Intermediate Layer Between Tread Base and Top Belt Ply

(C) Transition Layer as the Top Belt Ply

Figure 1:
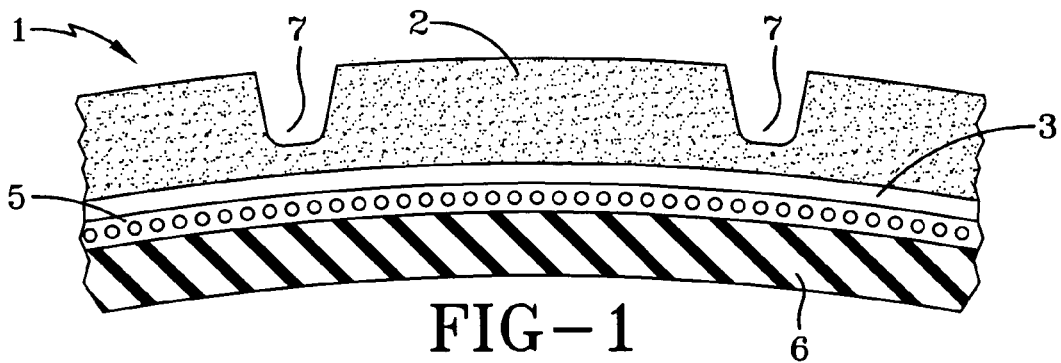
FIG. 1 represents a partial cross-section of a tire (1) having a tread comprised of an outer tread cap carbon black and/or silica reinforced rubber layer (2) having grooves (7) and a running surface intended to be ground-contacting and underlying tread base rubber layer (3) as a silica-rich, natural rubber based transition rubber layer (3), which is exclusive of cord reinforcement.
Figure 2:
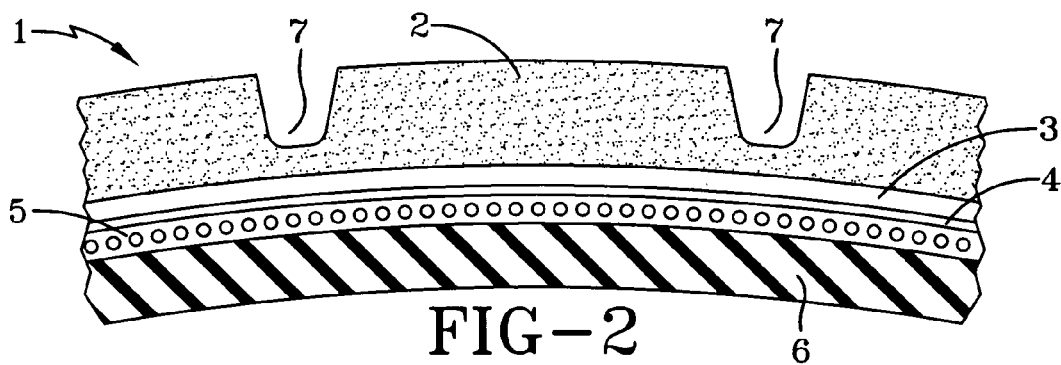
FIG. 2 represents a partial cross-section of a tire (1) having a tread comprised of an outer tread cap carbon black and/or silica reinforced rubber layer (2) having grooves (7) and a running surface intended to be ground-contacting and underlying tread base carbon black and/or silica reinforced rubber layer (3), together with a silica-rich, natural rubber based transition rubber layer (4), which is exclusive of cord reinforcement, wherein said transition rubber layer is positioned between said tread base layer (3) and top belt ply (5).
Figure 3:
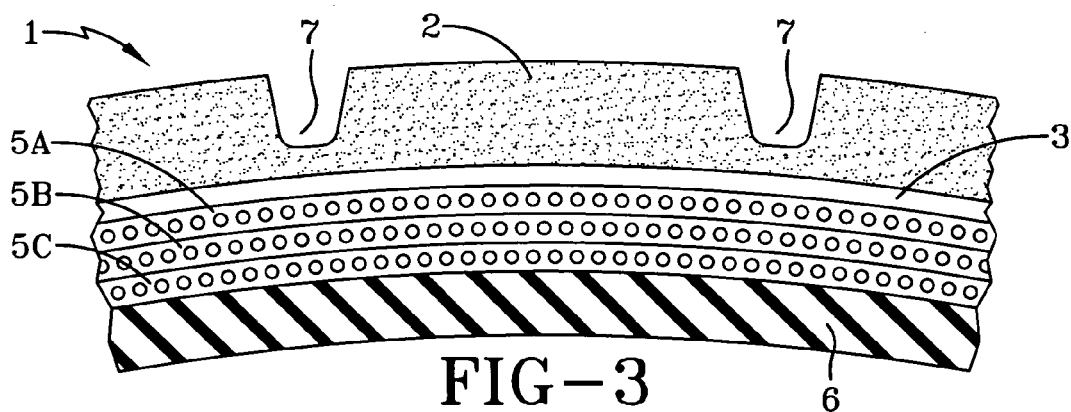

FIG. 3 represents a partial cross-section of a tire (1) having a tread comprised of an outer tread cap carbon black and/or silica reinforced rubber layer (2) having grooves (7) and a running surface intended to be ground-contacting and underlying tread base carbon black and/or silica reinforced rubber layer (3), circumferential belt plies (top belt ply 5A and intermediate, underlying belt plies 5B and 5C) comprised of rubber compositions which contain cord reinforcement, wherein said circumferential belt plies (5A, 5B and 5C) underlie said tread base rubber layer (3), wherein said top belt ply (5A) underlies said tread base rubber layer (3) and wherein said top belt ply (5A) is comprised of a silica-rich, natural rubber based rubber composition, as a transition rubber layer, having cord reinforcement therein.

Figure 4:
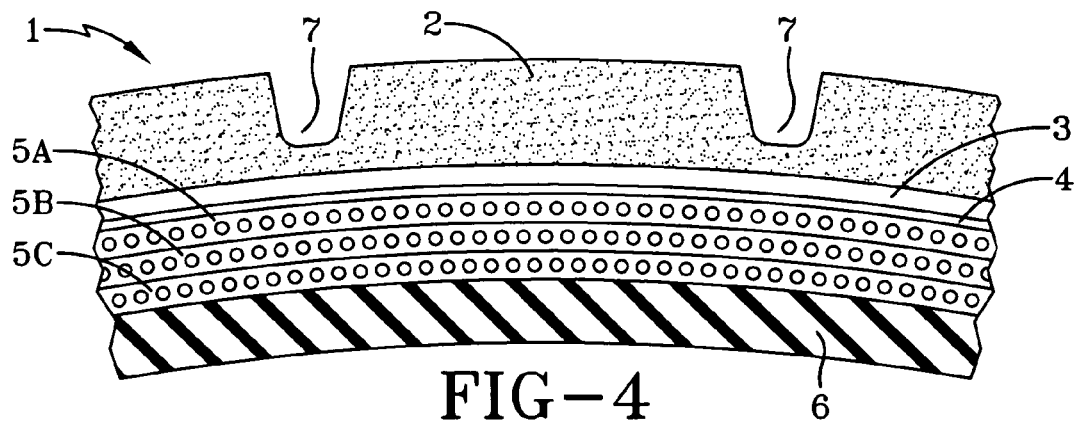

(D) Transition Layer Underlying Tread Base and Transition Layer as the Top Belt Ply FIG. 4 represents a partial cross-section of a tire (1) having a tread comprised of an outer tread cap carbon black and/or silica reinforced rubber layer (2) having grooves (7) and a running surface intended to be ground-contacting and underlying tread base carbon black and/or silica reinforced rubber layer (3), together with:

(1) a silica-rich, natural rubber based transition rubber layer (4), which is exclusive of cord reinforcement, wherein said transition rubber layer is positioned between the tread base (3) and top belt ply (5A), and (2) an additional natural rubber based transition layer as top belt ply (5A) positioned between transition layer (4) and intermediate, underlying belt ply (5B).

It is readily understood by those having skill in the art that the rubber composition of the transition layer rubber would be compounded by methods generally known in the rubber compounding art, such as mixing the various sulfur-vulcanizable constituent diene polymers with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example, silica and silica-carbon black mix. As known to those skilled in the art, depending on the intended use of the sulfur vulcanizable and sulfur vulcanized compounds or tread compounds, the additives mentioned above are selected and commonly used in conventional amounts.

Typical amounts of tackifier resins, if used, may comprise, for example, about 0.5 to about 10 phr, usually about 1 to about 5 phr. Typical amounts of processing aids may comprise, for example, about 1 to about 80 phr. Such processing aids can include, for example, aromatic, naphthenic, and/or paraffinic processing oils or plasticizer or low softening point polyethylene ether glycols. Typical amounts of antioxidants may comprise, for example, about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid may comprise, for example, about 0.5 to about 4 phr. Typical amounts of zinc oxide may comprise, for example, about 2 to about 5 phr. Typical amounts of waxes, if used, may comprise, for example, about 1 to about 5 phr. Often microcrystalline waxes are used. Typical amounts of peptizers, if used, may comprise, for example, about 0.1 to about 1 phr. Typical peptizers may be, for example, pentachlorothiophenol and dibenzamidodiphenyl disulfide. An antioxidant may be, for example, of the para-phenylene diamine and/or dihydrotrimethylquinoline type.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from, for example, about 0.5 to about 4 phr, with a range of from about one to about 2.5 sometimes being preferred.

Accelerators are used to control the time and/or temperature required for vulcanization and to improve the properties of the vulcanizate. Retarders are also used to control the vulcanization on-set.

In one embodiment, a single accelerator system may be used, i.e., primary accelerator. Conventionally and preferably, a primary accelerator(s) may be used in total amounts ranging, for example, from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate the cure and to improve the properties of the vulcanizate. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The selection and amounts of the various compounding ingredients are not considered to be critical for the purposes of this invention, except where they may be especially emphasized elsewhere in this description, and can be adjusted or modified by the practitioner as deemed suitable for the desired tire transition layer properties.

The tire can be built, shaped, molded and cured by various methods which are readily apparent to those having skill in such art.

The following examples serve to illustrate the invention in further detail but are not intended to limit the invention. The amounts, or parts, and percentages are by weight unless otherwise indicated.

Example I

Rubber samples of a silica-rich rubber composition for use for a transition rubber layer of this invention and is identified herein as Samples B and C with Sample A being a control.

Ingredients for the respective Samples are illustrated in the following Table 1.

TABLE 1

| Material | Control A | B | C |
|---|---|---|---|
| First Non-Productive Mixing (NP-1) | | | |
| Cis 1,4-polyisoprene rubber[1] | 100 | 100 | 100 |
| Carbon black[2] | 28 | 0 | 0 |
| Precipitated silica[3] | 8 | 25 | 25 |
| Coupling agent[4] | 1.5 | 0 | 0 |
| Rubber processing oil[5] | 0.5 | 5.5 | 7 |
| Zinc oxide | 7 | 7 | 7 |
| Tackifying resin[6] | 1.5 | 0 | 0 |
| Fatty acid[7] | 1 | 2 | 2 |
| Antidegradant[8] | 3.5 | 1 | 1 |
| Crosslinking resin[9] | 0 | 1 | 1 |
| Ester of rosin acid[10] | 0 | 4 | 4 |
| Second Non-Productive Mixing (NP-2) | | | |
| Precipitated silica[3] | 9 | 15 | 15 |
| Coupling agent[5] | 0 | 1.5 | 1.5 |

TABLE 1-continued

| Material | Control A | B | C |
|---|---|---|---|
| Productive mixing (P) | | | |
| Sulfur | 3 | 1.4 | 1.5 |
| Accelerators (curing aids)[11] | 2.25 | 3.2 | 3.35 |

[1] Cis-1,4-polyisoprene natural rubber
[2] N550 rubber reinforcing carbon black, an ASTM designation
[3] Precipitated silica as HiSil ™ 243LD from PPG Industries Inc.
[4] liquid silica coupling agent as a bis(3-triethoxysilylpropyl)polysulfide having an average of about 2.2 connecting sulfur atoms in its polysulfide bridge as Si266 ™ from the Degussa Company.
[5] Rubber processing oil as Flexon 641 from the ExxonMobil Company
[6] Phenol-formaldehyde type tackifying resin obtained as SP-1068 Resin ™ from the Schenectady Company
[7] Fatty acid as a mixture comprised of palmitic, oleic and stearic acid.
[8] Hindered phenol antidegradant
[9] As SP1056 Resin ™ from The Schenectady Company
[10] As Staybelite Ester 10 from the Middlesburg Company
[11] Accelerators as sulfenamide and diphenylguanidine types The rubber compositions were prepared by mixing the elastomers(s) together with reinforcing fillers and other rubber compounding ingredients in a first non-productive mixing stage (NP-1) an internal rubber mixer for about 4 minutes to a temperature of about 160° C. The rubber mixture is then mixed in a second non-productive mixing stage (NP-2) in an internal rubber mixer for about 3 minutes to a temperature of about 150° C. in which additional silica and coupling agent are added. The resulting rubber mixture is then mixed in a productive mixing stage (PR) in an internal rubber mixer with sulfur curatives for about 2 minutes to a temperature of about 110° C. The rubber composition is sheeted out and cooled to below 40° C. between each of the non-productive mixing steps and prior to the productive mixing step.

The following Table 2 illustrates cure behavior and various physical properties of the rubber Samples. Where a cured rubber sample was evaluated, such as for the stress-strain, rebound, hardness, tear strength and abrasion measurements, the rubber sample was cured for about 32 minutes at a temperature of about 150° C.

TABLE 2

Comparative Rubber Compositions

| Rubber Samples | Control A | B | C |
|---|---|---|---|
| N550 carbon black | 28 | 0 | 0 |
| Precipitated silica | 17 | 40 | 40 |
| Rheometer, 150° C. (MDR)[1] | | | |
| Maximum torque (dNm) | 26.67 | 14.19 | 15.45 |
| Minimum torque (dNm) | 2.24 | 1.93 | 2.24 |
| Delta torque (dNm) | 24.4 | 12.26 | 13.21 |
| T90, minutes | 6.53 | 39.12 | 33.68 |
| Stress-strain (ATS)[2] | | | |
| Tensile strength (MPa) | 20 | 8.33 | 14.5 |
| Elongation at break (%) | 350 | 530 | 610 |
| 300% modulus, ring (MPa) | 18 | 2.22 | 2.95 |
| Tear strength[3] | | | |
| 95° C., Newtons | 31 | 167 | 143 |

TABLE 2-continued

Comparative Rubber Compositions

| Rubber Samples | Control A | B | C |
|---|---|---|---|
| RPA, 100° C., 10% strain, 1 Hz[4] | | | |
| Storage modulus G', kPa | 1200 | 925 | 928 |
| Tan delta | 0.065 | 0.08 | 0.056 |

[1] Data obtained according to Moving Die Rheometer instrument, model MDR-2000 by Alpha Technologies, used for determining cure characteristics of elastomeric materials, such as for example Torque, T90 etc.
[2] Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3] Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument. Tear strength determined according to said tear strength test (peal strength adhesion test) is referred to herein as "Tear Strength".
[4] Data obtained according to Rubber Process Analyzer as RPA 2000 ™ instrument by Alpha Technologies, namely said tan delta and storage modulus (G') values determined for this Example at 100° C. test temperature, 10 percent strain and 1 Hertz.

From Table 2 it can be seen that the Control Sample A and Samples B and C all meet the target tan delta value of 0.1 or less referenced in Table A as indicated in Table 2 with reported values of 0.065, 0.08 and 0.056, respectively, and therefore exhibit a relatively low hysteresis which is considered herein as being beneficial for reducing heat build up in the transition layer.

The Control Sample A and Samples B and C also meet the target storage modulus G' value of 500 to 1500 kPa referenced in Table A as indicated in Table 2 with reported values of 1200, 925 and 928 kPa, respectively, and therefor indicate a suitable degree of low strain stiffness (10 percent strain at 100° C.).

However, the Control Sample A did not meet the target tear strength value of 100 Newtons referenced in Table A as indicated in Table 2 with a significantly low reported value of 31 Newtons as compared to significantly higher values of 167 Newtons and 143 Newtons for Samples B and C so that the rubber composition of Control Sample A is considered herein as being a relatively poor choice for the rubber composition for the transition rubber layer as compared to Samples B and C.

Accordingly, Samples B and C exhibited a combination of the all of the targeted tan delta (hysteresis), storage modulus (stiffness) and tear strength properties for the rubber composition of the transition rubber layer.

While certain representative embodiments and details have been shown for the purpose of illustrating the invention, it will be apparent to those skilled in this art that various changes and modifications may be made therein without departing from the spirit or scope of the invention.

What is claimed is:

1. A light duty tire with a circumferential tread of a cap/base construction and a circumferential belt layer;
   wherein said light duty tire has a maximum load bearing capacity of less than or equal to 3,500 pounds (1587 kg);
   wherein said tread cap/base construction is comprised of a circumferential outer tread cap rubber layer which contains a running surface for the tire and an underlying carbon black reinforced tread base rubber layer;
   wherein said circumferential belt layer is comprised of a rubber composition which contains cord reinforcement comprised of a plurality of cords and underlies said circumferential tread;

characterized in that said light duty tire contains an internal non-black colored silica-rich, cis 1,4-polyisoprene rubber based transition rubber layer, wherein said transition rubber layer is an intermediate rubber layer, which is exclusive of cord reinforcement and is positioned between said tread base rubber layer and said circumferential belt layer;

wherein said silica-rich transition rubber layer is of a rubber composition comprised of, based upon [100] parts by weight per 100 parts by weight rubber (phr);

(1) rubber comprised of:
  (a) natural cis 1,4-polyisoprene rubber, or
  (b) a combination of natural cis 1,4-polyisoprene rubber and synthetic cis 1,4-polyisoprene rubber, or
  (c) natural cis 1,4-polyisoprene rubber and up to 25 phr of at least one additional diene-based rubber, or
  (d) a combination of natural cis 1,4-polyisoprene rubber and synthetic cis 1,4-polyisoprene rubber and up to 25 phr of at least one additional diene-based rubber
(2) about 30 to about 55 phr of reinforcing filler consisting of precipitated silica, and
(3) coupling agent for said precipitated silica having a moiety reactive with hydroxyl groups contained on said precipitated silica and another different moiety interactive with said cis 1,4-polyisoprene rubber and said additional diene-based elastomer and wherein said rubber composition of said transition layer contains anti-reversion agent(s) comprised of at least one of N,N'metaphenylenebismaleimide, hexamethylene bis-thiosulfate salt dihydrate and 1,3-bis(citraconimidamethyl benzene), and wherein the rubber composition of said transition rubber layer contains a colorant to color said transition rubber layer a color other than a black color and wherein the rubber composition of said transition rubber layer:
(A) has a tan delta (100° C., 10% strain, 1 Hz) of 0.1 or less and a tear resistance of greater than 100 Newtons, and
(B) has a storage modulus G' (100° C., 10% strain, 1 Hz) in a range of from about 500 to about 1500 kPa.

2. The tire of claim 1 wherein said additional diene-based elastomer is comprised of at least one of polymer and copolymer of dienes of at least one of isoprene and 1,3-butadiene and copolymers of styrene and at least one of isoprene and 1,3-butadiene, other than said cis 1,4-polysioprene rubber.

3. The tire of claim 1 wherein the rubber of said silica-rich transition rubber layer is comprised of natural cis 1,4-polyisoprene rubber.

4. The tire of claim 1 wherein the rubber of said silica-rich transition rubber layer is comprised of a combination of natural cis 1,4-polyisoprene rubber and synthetic cis 1,4-polyisoprene rubber.

5. The tire of claim 1 wherein the rubber of said silica-rich transition rubber layer is comprised of natural cis 1,4-polyisoprene rubber and up to 25 phr of at least one additional diene-based rubber.

6. The tire of claim 1 wherein the rubber of said silica-rich transition rubber layer is comprised of a combination of natural cis 1,4-polyisoprene rubber and synthetic cis 1,4-polyisoprene rubber and up to 25 phr of at least one additional diene-based rubber.

7. The tire of claim 1 wherein said light duty tire is a passenger tire.

* * * * *